United States Patent [19]
Wilcox, Jr.

[11] 3,987,608
[45] Oct. 26, 1976

[54] FRUIT PICKING APPARATUS

[76] Inventor: Dana V. Wilcox, Jr., 13008 Amesbury St., Woodbridge, Va. 22191

[22] Filed: Sept. 25, 1974

[21] Appl. No.: 509,117

[52] U.S. Cl. .............................................. 56/328 R
[51] Int. Cl.² ........................................ A01D 46/20
[58] Field of Search ........... 56/328 R, 327 R; 182/2; 193/7; 214/83.28, 83.3, 77 R; 298/23 MD

[56] References Cited
UNITED STATES PATENTS

| | | | |
|---|---|---|---|
| 2,870,594 | 1/1959 | Larsh | 56/328 R |
| 3,127,725 | 4/1964 | Richardson | 56/328 R |
| 3,347,587 | 10/1967 | Frost | 56/328 R |
| 3,401,514 | 9/1968 | Clark | 56/328 R |
| 3,507,105 | 4/1970 | Mays et al | 56/328 R |
| 3,541,772 | 11/1970 | Miller | 56/328 R |
| 3,744,226 | 7/1973 | Granger | 56/328 R |

*Primary Examiner*—Russell R. Kinsey
*Attorney, Agent, or Firm*—Strauch, Nolan, Neale, Nies & Kurz

[57] ABSTRACT

Apparatus for picking fruit wherein an angularly adjustable boom assembly is mounted on a carriage turntable and a picker head comprising a hollow lightweight rotor having a plurality of fruit picking fingers extending therefrom is mounted on the upper end of the boom assembly, the boom assembly being longitudinally extensible and carrying a correspondingly longitudinally extensible fruit conveyor system that maintains its upper end in position to directly receive picked fruit from the picker head and its lower end in position to discharge the fruit directly into one or more collector receptacles on the carriage at the base of the boom assembly in all fruit picking positions of the boom assembly, and an operator's platform is mounted on the upper end of the boom assembly adjacent the rotor with adjacent controls for determining boom angularity and extension and carriage movement disposed within the operator's reach.

10 Claims, 13 Drawing Figures

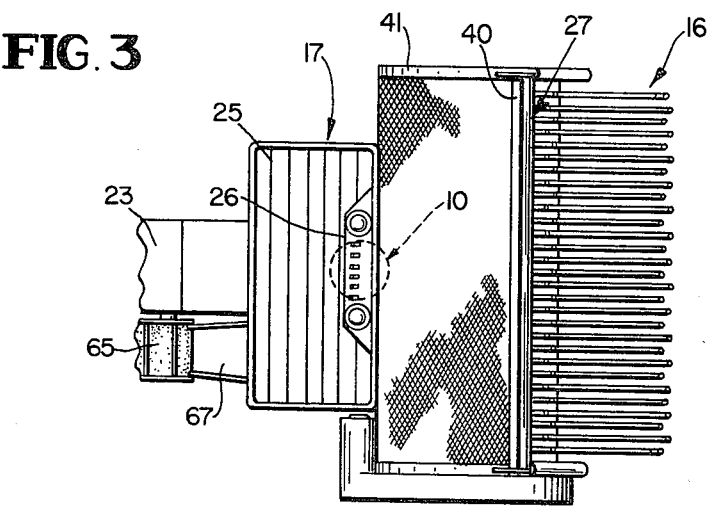
FIG. 3
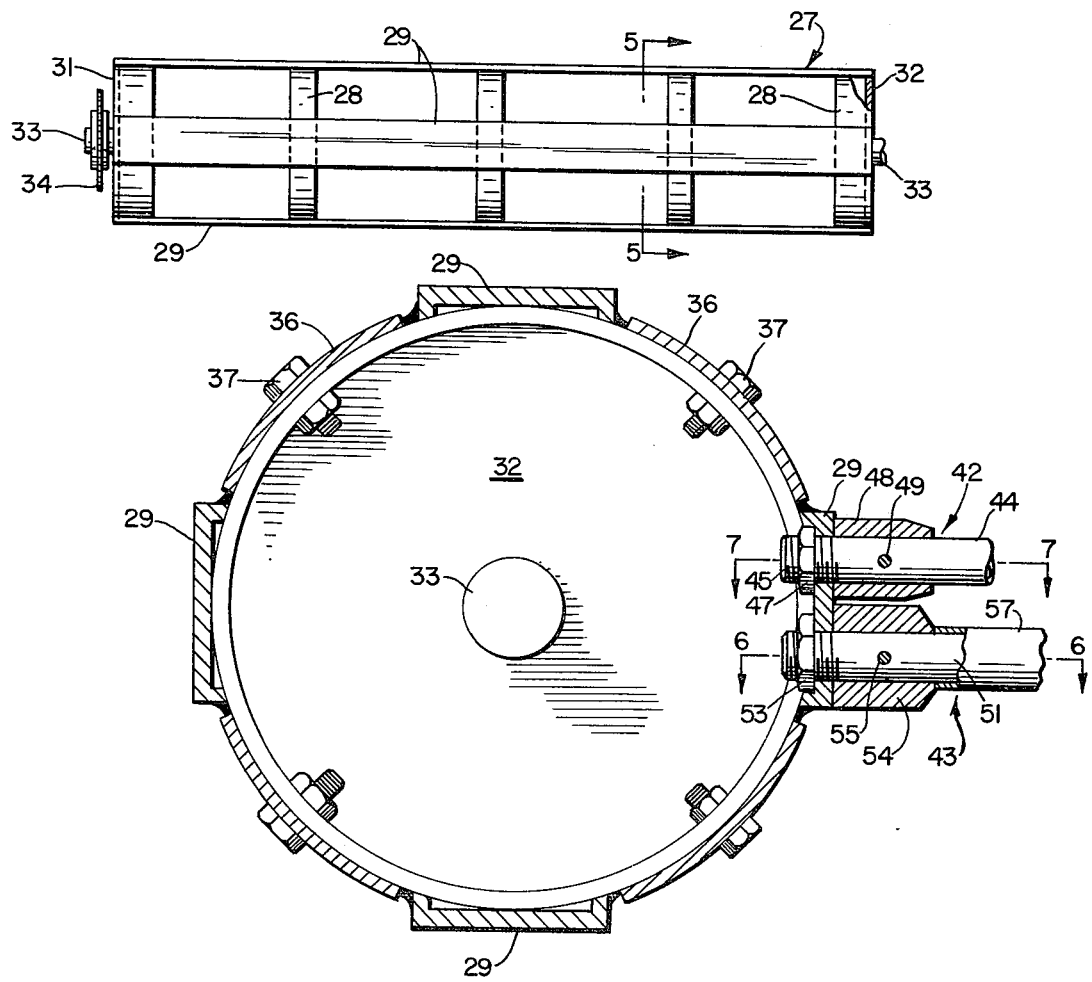
FIG. 4
FIG. 5

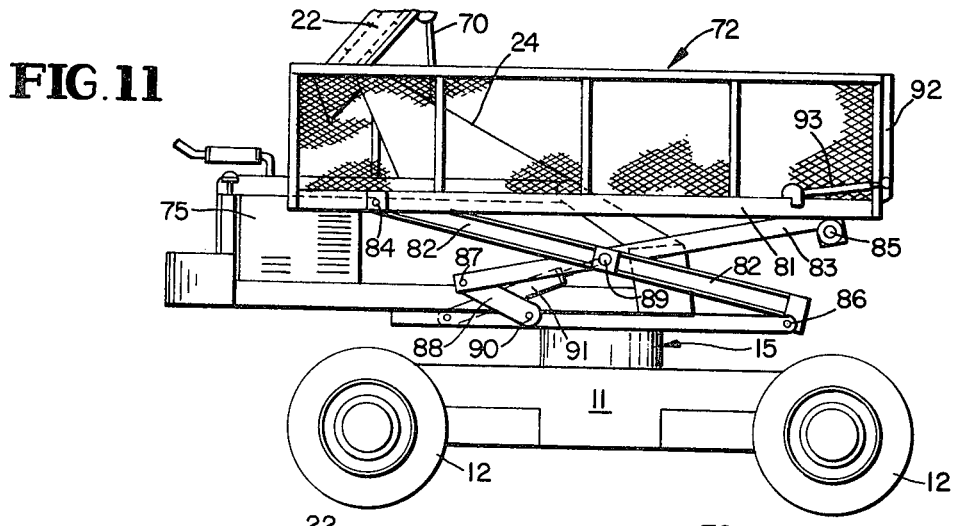
FIG. 11
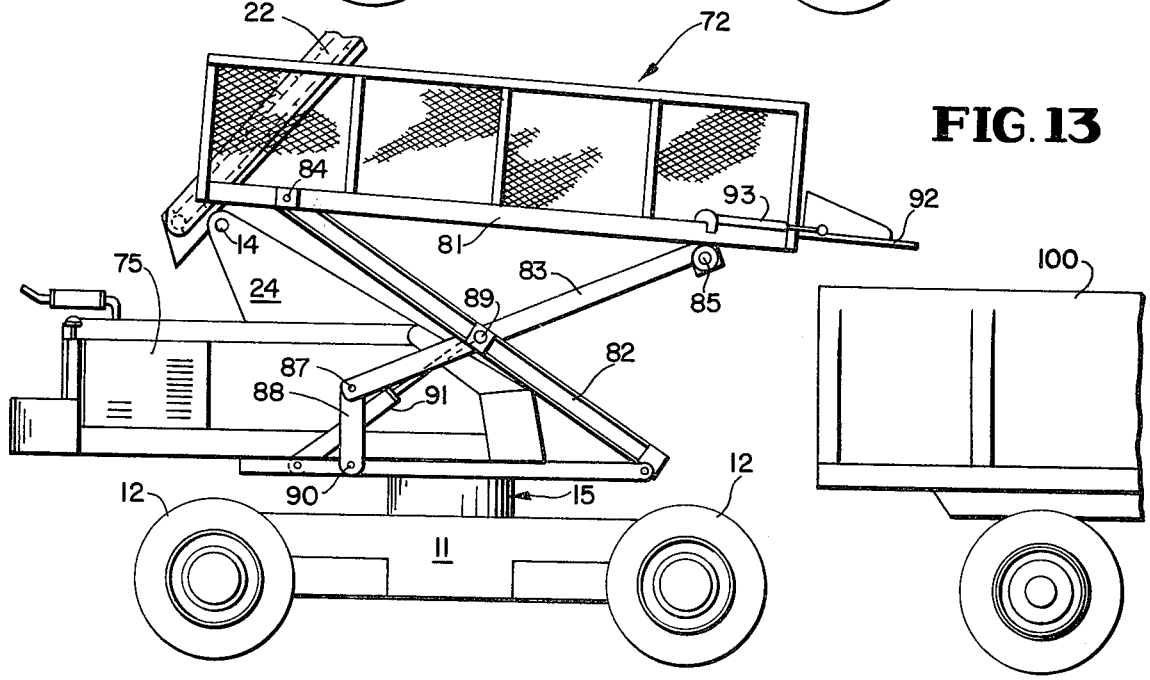
FIG. 12
FIG. 13

FRUIT PICKING APPARATUS

FRUIT PICKING APPARATUS

This invention relates to fruit picking apparatus as for oranges, grapefruit and the like and particularly to such apparatus wherein an operator on the upper end of an extensible boom assembly may closely control the position and operation of a picker head relative to a tree bearing the fruit, the picker head being of novel construction and mode of operation and the collected fruit being handled in a novel manner.

Fruit picking apparatus wherein a rotating finger picker head is mounted in the top of a boom supported by a turntable on a wheeled carriage has been proposed as disclosed in Richardson U.S. Pat. No. 3,127,725. The present invention is essentially an improvement over the Richardson type apparatus, in that it provides an extensible boom and conveyor assembly as compared with Richardson's fixed length boom, the picker head is of novel construction, the operator is stationed on a control platform at the upper end of the boom where he may clearly and directly observe and control the picking action as compared with the operator being stationed at ground level in Richardson, and an improved receptacle arrangement for collecting the picked fruit is provided.

In its preferred embodiment the invention will be described as providing an operator control platform and an adjacent picker head assembly at the upper end of an extensible boom assembly swivelly mounted on a wheeled carriage, so that the operator may reliably control the position of the platform and the picker head assembly relative to the tree and closely observe the picking action and regulate it, and this is a major object of the invention.

It is an object of the invention to provide a novel picker head assembly wherein a hollow fabricated rotor is provided with a plurality of circumferentially spaced longitudinal sets of coacting fruit picking fingers, each set comprising coacting rows of upper and lower fingers, with one set mounting free rollers that aid the picking action.

Another object of the invention is to provide novel fruit picker apparatus wherein the operator is stationed on a platform at the upper end of an extensible boom assembly adjacent the fruit picker head and in position to look directly into the picking area, and an extensible conveyor system is provided to convey the picked fruit from the picker head down the boom assembly to a special receptacle arrangement at the base of the boom assembly.

A further object of the invention is to provide a novel fruit picker apparatus wherein the collected fruit is deposited in a special receptacle arrangement at the base of the boom assembly which is mounted on a special structure so that it may be raised to dump its contents into a truck or the like.

BRIEF DESCRIPTION OF DRAWINGS

FIG. 3 is a fragmentary top plan view showing the control station;

FIG. 4 is a fragmentary plan view showing structural detail of the picker head rotor with the picking fingers removed;

FIG. 5 is an enlarged section substantially on line 5—5 in FIG. 4 showing rotor construction and finger mounting;

FIG. 11 is a side elevation showing the lower end of the apparatus and the fruit collection receptcle; and FIGS. 12 and 13 are side views in elevation showing different positions of the receptacle in elevating from the position of FIG. 11 where it receives the picked fruit and transfer of the fruit to a truck.

PREFERRED EMBODIMENTS

Figure 1:
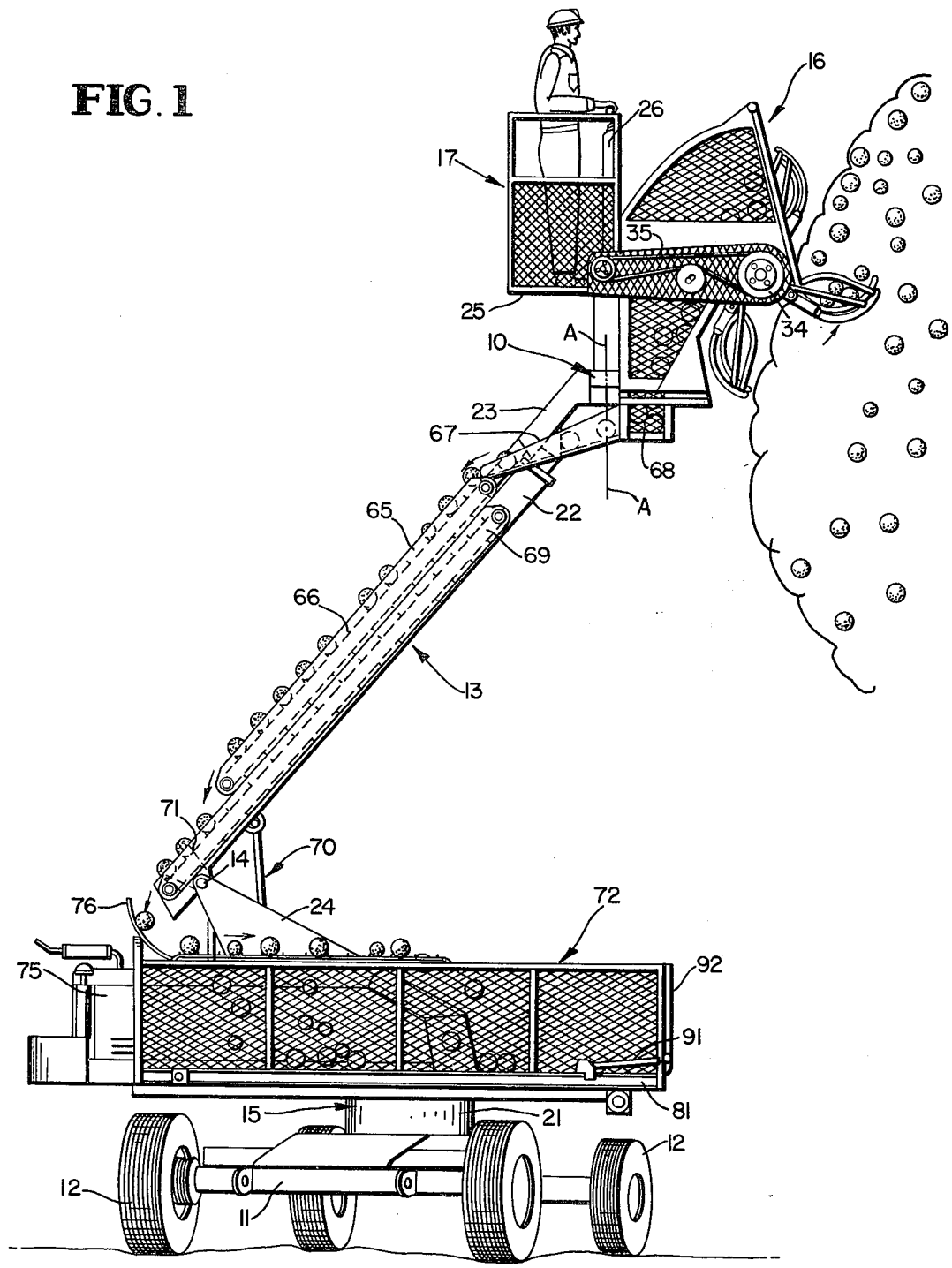
FIG. 1 is a generally diagrammatic elevation illustrating the overall organization of a fruit picker of the invention according to a preferred embodiment.

Referring to FIG. 1 the fruit picking apparatus of the invention consists essentially of a carriage 11 supported by ground engaging wheels 12, an extensible boom assembly 13 pivoted at its lower end at 14 on a turntable arrangement 15 which may swivel about a vertical axis on the carriage, and a fruit picker head assembly 16 and a control platform assembly 17 on the upper end of the boom assembly. The fruit picker head and platform 17 are mounted on the boom assembly for swinging as a unit through an angle of about 120° for traversing the tree in a selected boom position during the picking operation.

The turntable arrangement 15 is rotatably supported on a column 21 on the carriage, and suitable conventional means is provided for turning the turntable and all the apparatus on it to any desired position about a vertical axis.

The boom assembly 13 comprises two relatively slidable boom members 22 and 23, member 22 being pivoted at 14 to a support structure 24 on the turntable. In the preferred embodiment the picker head and platform are carried by the upper relatively rotatable member of a combined motor and bearing unit 10 on the upper end of boom member 23, for turning about the axis indicated at A—A under control of the operator. Member 23 is suitably slidably carried by member 22 and projects above the upper end of member 22 where the picker head and the control platform floor 25 (FIG. 3) are mounted on it as described. An operator on platform floor 25 has access to a control panel 26 for effecting drive of the carriage, turning of turntable and obtaining the desired inclination of the boom system for orienting the picker head with respect to the tree.

The picker head assembly 16 comprises a fabricated rotor 27 (FIG. 4) having a longitudinally spaced plurality of parallel concentric short cylinders 28 and a plurality of longitudinally extending circumferentially spaced parallel flat finger mounting bars 29 that are secured as by welding to the outer peripheries of cylinders 28. The opposite ends of the rotor are closed as by end plates 31 and 32 secured to the adjacent cylinders 28, and central stub shafts 33 are fixed as by welding to the end plates. One shaft 33 projects to mount a sprocket 34 adapted to be connected to a power driven chain 35 for rotating the rotor and the fingers during the fruit picking operation. The other stub shaft is journaled. A series of relatively thin transversely arcuate sheet metal members 36 extend longitudinally of the rotor in the spaces between the flat bars 29 and are preferably secured to the cylinders 28 as by bolts 37.

Figure 2:
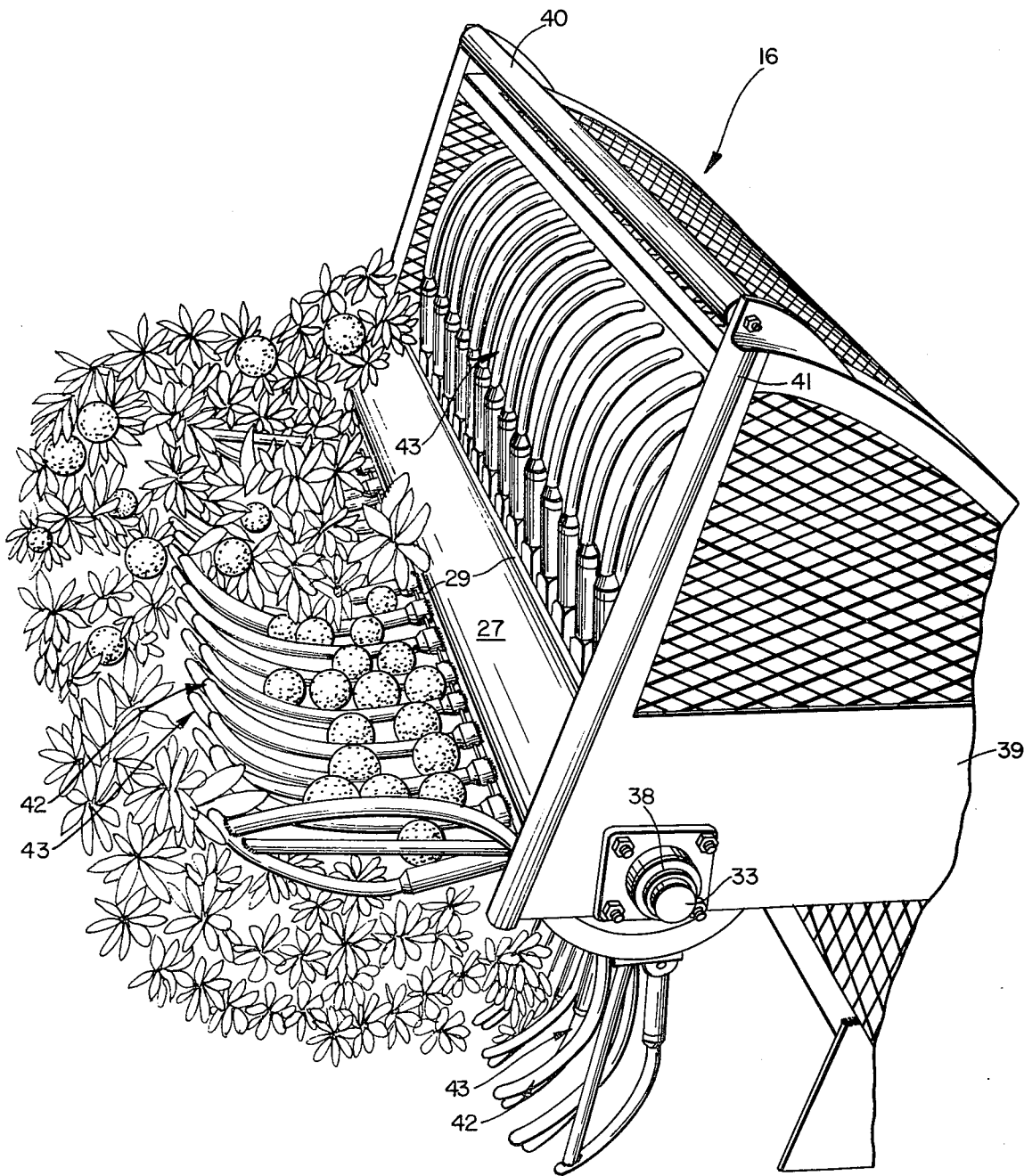
FIG. 2 is a fragmentary enlarged generally perspective view illustrating fruit picker head detail.

The rotor therefore is a fabricated hollow light weight inexpensive assembly carried by end shafts 33 which are rotatably supported at opposite ends of the rotor. As shown in FIG. 2, the rotor shaft 33 opposite the sprocket carrying end is journaled in a bearing assembly 38 on a side wall 39 of a relatively rigid picker head frame 41.

Attached to each bar 29 are two sets of the picker fingers that actually engage and pluck the fruit from a tree during rotation of the rotor. These sets comprise an upper row 42 and a lower row 43, and in a picker head having four longitudinal bars 29 as shown there are four sets of these fingers. As shown in FIGS. 2 and 3 there may be many of these fingers (perhaps fifteen) spaced longitudinally along the rotor on each bar 29.

Figure 6:
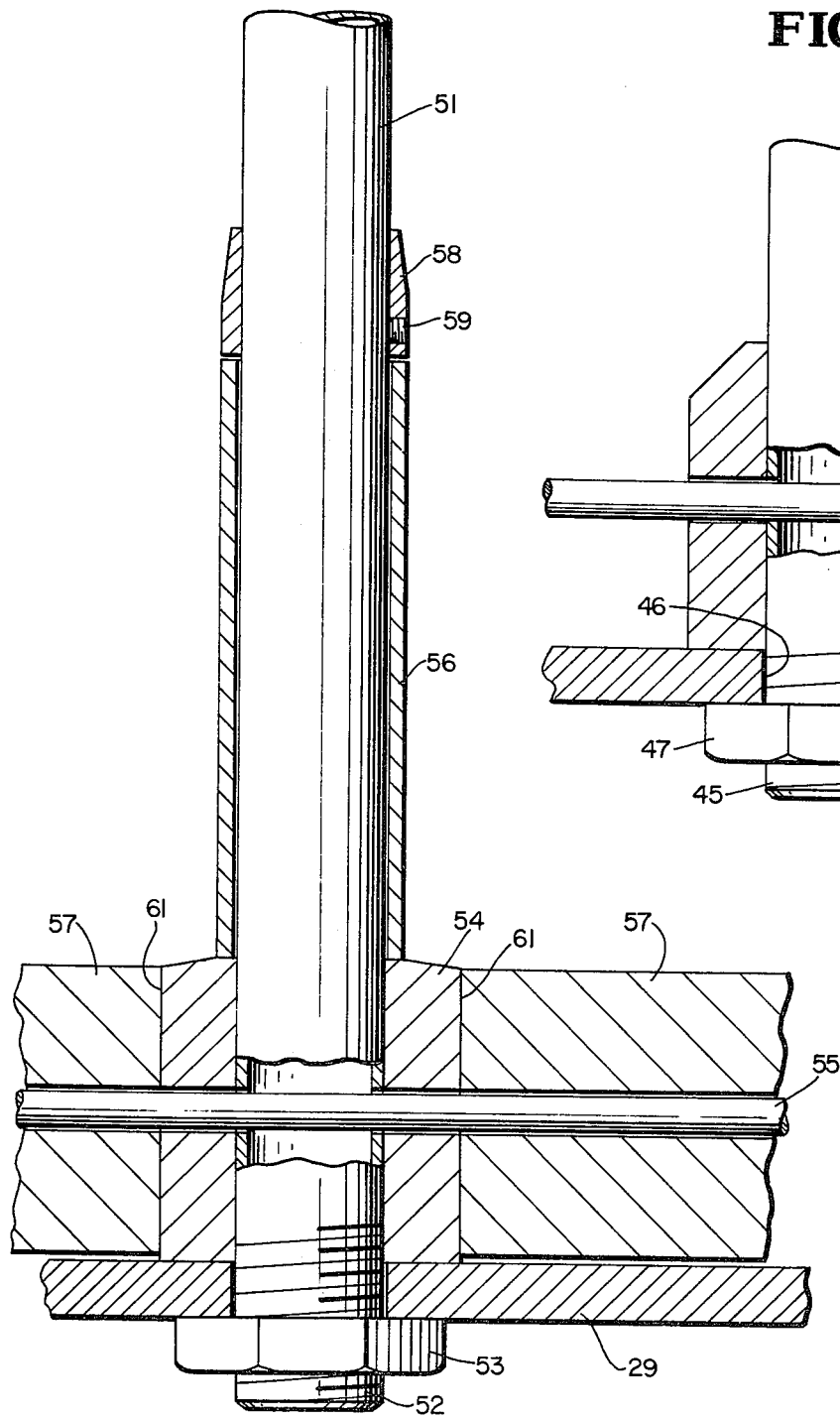
FIG. 6 is an enlarged fragmentary section substantially on line 6—6 of FIG. 5 showing detail of the mounting of one set of fingers on the rotor.
Figure 7:
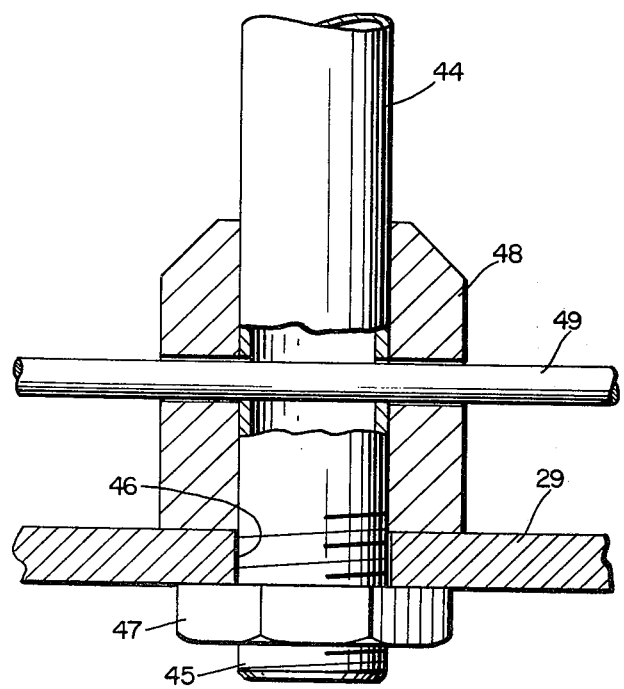
FIG. 7 is an enlarged fragmentary section substantially on line 7—7 of FIG. 5 showing detail of the mounting of the other set of fingers.

Referring to FIGS. 5–7 each upper finger 44 of row 42 has a threaded inner end 45 that extends through an opening 46 in bar 29 to receive a holding nut 47. A short sleeve 48 surrounds the lower end of finger 44 on the outer side of bar 29, and a locking rod 49 extends the length of rotor 27 parallel to the rotor axis. As shown in FIG. 7, the locking rod 49 passes slidably through diametrically aligned radial apertures in sleeve 48 and finger 44, and it is fixed at opposite ends to frame 41.

When nut 47 is tightened the coaction of the nut with sleeve 48 held by rod 49 fixes the inner end of the finger 44 to bar 29. This structure is provided for mounting each finger 44, and it holds each upper row finger 44 in a desired orientation relative to the associated fingers in the lower row.

FIG. 6 shows in detail the mounting of each lower finger 51. The inner end is threaded at 52 to extend through an opening in bar 29 and mount holding nut 53. A sleeve 54 surrounds finger 51 at the outer side of bar 29, and a longitudinal locking rod 55 extends through aligned radial apertures in sleeve 54 and finger 51 and is anchored at opposite ends on the frame 41. This is substantially the same as for the upper rods.

The lower finger arrangement differs from the upper however in that a freely rotatable roller 56 is mounted on the inner end of each finger 51, and freely rotatable rollers 57 are mounted on the locking rod 55 between each adjacent finger 51.

Rollers 56 are axially held against substantial sliding along a finger 51 by abutment with sleeve 54 at the inner end and abutment at the outer end with a collar 58 fixed on the fingers as by set screw 59.

Rollers 57 are axially held against substantial movement along rod 55 by end abutment with adjacent sleeves 54. Rollers 57 are preferably flat ended and abut flat side faces 61 on the sleeves 54.

Fingers 44 and 51 are lightweight but stiff hollow tubes of aluminum of smooth cylindrical cross section and having closed smooth rounded outer ends so as not to harm the fruit. They extend similarly arcuately from the rotor and their action in plucking the fruit will later be described.

An important feature of the invention is that the operator platform 25 is carried by the upper end of the extensible boom assembly where, as shown in FIG. 1, so that he may always look downwardly and forwardly directly into the tree area being picked, and he may therefore adjust the controls which comprise suitable electrical and hydraulic lines (not shown) connected to buttons and levers on control panel 26 to move the carriage position and adjust the boom extension and/or angularity for optimum picking action.

The boom members 22 and 23 are connected for relative longitudinal sliding so that the boom length may be extended as desired. Any desirable slide guide connection between the boom members may be provided, as in the extensible boom structure disclosed in Grove Pat. No. 3,776,367 except that a side of the telescoped boom members of Grove may be opened or otherwise modified to mount the fruit conveyor units later described on the respective members, and the operator's platform is preferably mounted on the upper end of boom member 23 as described.

Each of the boom members 22 and 23 carries a separate endless belt conveyor unit and these units are disposed in such association as to provide an effectively extensible conveyor means that corresponds to the condition of relative extension of the boom members. As shown in FIG. 1 a conveyor unit 65 having transverse fruit catching ribs 66 is mounted on boom member 23, and a chute 67 which may be laterally flexible to accommodate lateral swinging of the picker head assembly extending from the bottom of a basket structure 68 in the lower part of the picker head to discharge picked fruit onto the downgoing flight of conveyor unit 65.

A second conveyor unit 69 having transverse fruit catching ribs 71 is mounted on boom member 22 and the lower discharge end of conveyor unit 69 is located above a special receptacle arrangement 72 on the carriage.

The conveyors 65 and 69 are so relatively located that as boom member 23 moves longitudinally with respect to boom member 22 the lower end of conveyor 65 discharges always onto the upper flight of conveyor 69. A hydraulic lift cylinder assembly indicated at 70 controls the boom angularity.

Referring particularly now to FIGS. 1, 8 and 11-13 the receptacle assembly 72 comprises two fruit collector receptacle units 73 and 74 that extend on opposite sides of the engine housing 75 and the boom support 24. As shown in FIG. 1 the fruit discharged from the lower end of conveyor 69 encounters a curved end guide pan 76 which (FIG. 8) causes the fruit to move rearward, to the right in FIG. 1 as illustrated.

Figure 8:
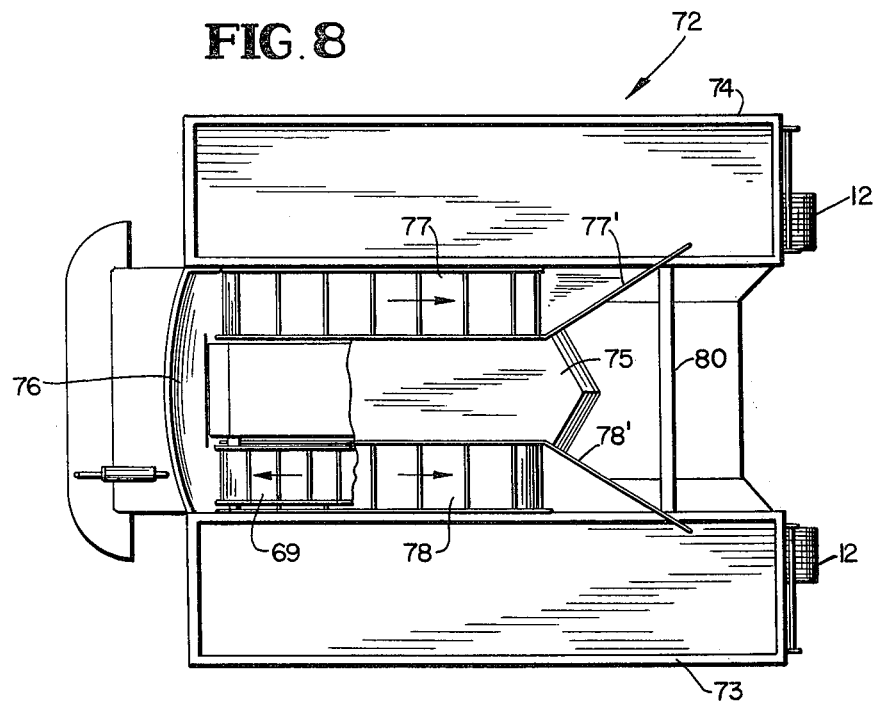
FIG. 8 is a top plan view illustrating the fruit collection arrangement at the lower end of the picking head boom.
Figure 10:
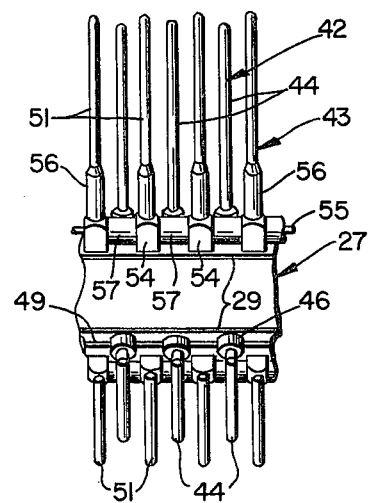
FIG. 10 is an enlarged fragmentary front view showing detail of FIG. 9.
Figure 9:
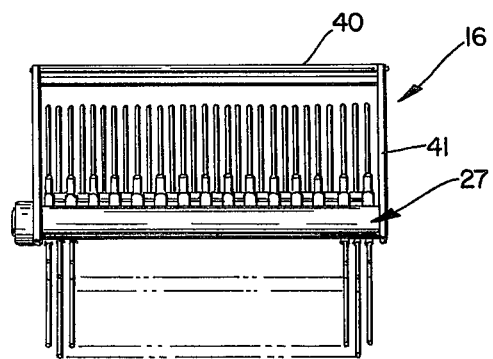
FIG. 9 is a front elevation showing detail as to the rollers and related structure at the fruit picking fingers.

Two horizontal conveyor belts 77 and 78 as shown in FIG. 8 extend along opposite sides of the motor housing with their upper flights substantially level with the upper edges of receptacle units 73 and 74. Conveyors 77 and 78 receive the fruit from pan 76 and move it rearwardly while it drops off laterally into the collector units. Preferably fixed deflectors 77' and 78' are provided above the ends of conveyors 77 and 78 to complete removal of the fruit. This provides good distribution of fruit in the collectors.

The collector units and the conveyors are mounted on a horizontal base frame 81 the opposite sides of which are rigidly connected together by cross member 80 rearwardly of motor housing 75 and a similar cross member (not shown) forwardly of the motor housing.

Frame 81 is mountd upon an elevating system comprising under each side of the frame 81 levers 82 and 83 pivoted to frame 81 at 84 and 85 respectively. Lever 82 is pivoted directly to the carriage at 86 and lever 83 is pivotally connected at 87 at its lower end to a short lever 88 that in turn is pivoted directly on the carriage at 90. Levers 82 and 83 are pivotally interconnected intermediate their ends at 89, and a hydraulic cylinder unit 91 is connected to the lever system at the axis of pivot 89.

At the rear ends of the fruit collector units pivoted gates 92 are provided which are swung down by hydraulic cylinders 93 during dumping. FIG. 11 shows the collector units as they are located during picking. FIG. 12 shows the action of cylinder 91 in raising the collector units to a height suitable for dumping into a truck. FIG. 13 shows the collector units tipped slightly about pivot 85 for dumping the collected fruit into a truck 100.

In operation the carriage is driven close to a tree and the boom extension and angularity and the picker head position manipulated by the operator on platform floor 25. Preferably the picker head is raised vertically from a lower position into the three branches, free roller 40 at the top of the cage partly surrounding the rotor first contacting the branches and pushing them aside gently.

With the picker head in position so that as fingers 44 and 51 extend into and comb through the tree branches rotation of the rotor accomplishes the picking action. The offset adjacent fingers of the upper and lower rows coact to effectively pull and twist the fruit in simulation of the action of a human hand as it is being removed from a branch, and the rollers 56 and 57 contribute to make this operation smooth with little or no sliding friction between the tree branches and the fingers as the fruit is being plucked.

The fruit gathered by the rotor descends to the lower part 68 of the picker head where chute 67 conveys it to the upper end of the extensible conveyor system 65, 69. The fruit is collected at the base of the boom assembly by the collector units, and after they are filled the units are raised and tilted to dump the fruit into a waiting truck.

Thus the invention is peculiarly advantageous in that it efficiently picks the fruit off the tree and transports it, without the need for manual handling, to the waiting transport truck shown in FIG. 13. The savings in labor costs and through elimination of careless handling of the fruit are considerable, and the whole operation is speeded up.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent Is:

1. Apparatus for picking fruit comprising a carriage adapted to be moved along the ground adjacent a tree to be picked, a support structure mounted on said carriage for turning about a generally vertical axis, a boom assembly, means pivotally mounting the lower end of said boom assembly on said support structure for swinging the boom assembly about a transverse axis, a frame movably mounted on said support structure, a fruit collecting receptacle mounted on said frame adjacent the base of said boom assembly, a picker head comprising a rotor rotatable about an axis transversely of the boom assembly and having a plurality of fruit picking fingers extending therefrom laterally swingably mounted on the upper end of the boom assembly, said boom assembly carrying a fruit conveyor system having its upper end adjacent the picker head and having its lower end positioned adjacent said receptacle, means extending between the picker head and said conveyor assembly for conveying picked fruit from the picker head to the upper end of said conveyor assembly during picking, means on said frame for continually directing fruit from said conveying means into said receptacle, an operator control platform on the upper end of said boom assembly adjacent said picker head, said platform being so located as to enable the operator to look down on the rotating picking fingers during fruit picking, and means for elevating and tipping said frame relative to said support structure for unloading said receptacle.

2. In the apparatus defined in claim 1, said means for directing fruit into the receptacle comprising a driven conveyor on said frame having a flight extending, during fruit picking, between a position adjacent the lower end of said boom assembly to the receptacle.

3. In the apparatus defined in claim 1, said rotor having circumferentially spaced sets of fruit picking fingers mounted thereon, each set comprising coextensive rows of offset upper and lower fingers projecting from the rotor periphery, locking rods extending longitudinally of the rotor through the base ends of the fingers of each row in each set, free rollers mounted on the fingers of one row of each set adjacent the base ends and free rollers mounted on the locking rod of said one row between each pair of adjacent fingers.

4. In the apparatus defined in claim 3, said fingers of each set being so constructed and arranged as to effectively pull and twist the fruit engaged thereby in simulation of the action of a human hand.

5. The apparatus defined in claim 1, wherein an operators's platform is mounted on the upper end of the boom assembly adjacent the rotor and controls for determing boom angularity and extension and carriage movement are mounted within the operator's reach.

6. The apparatus defined in claim 1, wherein said boom assembly comprises two longitudinally slidably connected members each carrying a longitudinally extending conveyor unit.

7. Apparatus for picking fruit wherein an angularly adjustable boom assembly is mounted on a carriage and a picker head comprising a rotor having a plurality of fruit picking fingers extending therefrom is mounted on the upper end of the boom assembly and conveying means is mounted on said boom assembly with its upper end in position to directly receive picked fruit from the picker head and with its lower end in position to discharge the fruit directly into a collector arrangement at the base of the boom assembly, said rotor being hollow and generally cylindrical and having circumferentially spaced sets of fruit picking fingers mounted thereon, each set comprising coextensive rows of offset upper and lower fingers and said rotor having circumferentially spaced longitudinal members on its periphery with the inner ends of said fingers of each set being attached to one of said longitudinal members.

8. The apparatus defined in claim 7, wherein locking rods extend longitudinally through the fingers of each row in each set.

9. The apparatus defined in claim 8, wherein free rollers are mounted on the fingers of one row of each set adjacent said longitudinal members, and free rollers are mounted on the locking rod of said one row between each pair of adjacent fingers.

10. The apparatus defined in claim 7, wherein said rotor is partially enclosed by means mounting a free roller extending parallel to the rotor axis.

* * * * *